(12) United States Patent
Hubert et al.

(10) Patent No.: US 12,519,343 B2
(45) Date of Patent: *Jan. 6, 2026

(54) BEARING WITH INCORPORATED WIRELESS POWER TRANSMISSION DEVICE

(71) Applicant: AKTIEBOLAGET SKF, Gothenburg (SE)

(72) Inventors: Mathieu Hubert, Ann Arbor, MI (US); David Christopher Rybski, White Lake, MI (US); Gene A Kovacs, Brighton, MI (US); William Robert George, Ypsilanti, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/596,732

(22) Filed: Mar. 6, 2024

(65) Prior Publication Data

US 2025/0286404 A1    Sep. 11, 2025

(51) Int. Cl.
| | |
|---|---|
| *H02J 50/10* | (2016.01) |
| *F16C 41/00* | (2006.01) |
| *H02K 5/04* | (2006.01) |
| *H02K 7/00* | (2006.01) |
| *B60L 50/60* | (2019.01) |

(52) U.S. Cl.
CPC .............. *H02J 50/10* (2016.02); *F16C 41/00* (2013.01); *H02K 5/04* (2013.01); *H02K 7/003* (2013.01); *B60L 50/60* (2019.02); *B60L 2210/30* (2013.01); *B60L 2210/40* (2013.01); *F16C 2380/26* (2013.01)

(58) Field of Classification Search
CPC ....... H02J 50/10; F16C 41/00; F16C 2380/26; H02K 5/04; H02K 7/003; B60L 50/60; B60L 2210/30; B60L 2210/40
USPC .......................................................... 307/10.1
See application file for complete search history.

(56) References Cited

U.S. PATENT DOCUMENTS

| | | | |
|---|---|---|---|
| 7,688,216 B2* | 3/2010 | Mizutani | G08C 17/00 340/663 |
| 2019/0179028 A1* | 6/2019 | Pacala | G01S 7/4863 |
| 2021/0189805 A1* | 6/2021 | Beck | F04B 47/06 |
| 2021/0358686 A1* | 11/2021 | Raminosoa | H01F 38/18 |
| 2022/0037937 A1* | 2/2022 | Altman | H02K 1/2789 |

* cited by examiner

*Primary Examiner* — Alfonso Perez Borroto
(74) *Attorney, Agent, or Firm* — J-TEK LAW PLLC; Scott T. Wakeman; Mark A. Ussai

(57) ABSTRACT

A bearing assembly includes an outer ring connectable with a housing, the outer ring having an outer raceway and a transmitter coil spaced axially from the outer raceway. The transmitter coil is electrically connectable with a battery and is configured to generate an electromagnetic field when current flows through the transmitter coil. An inner ring is disposeable about a rotor shaft and has an inner raceway and a receiver coil spaced axially from the inner raceway so as to be located proximal to and inductively coupled with the transmitter coil such that electric current is generated within the receiver coil when current flows through the transmitter coil. The receiver coil is connected to electromagnetic coils of a motor rotor such that electric current flows from receiver coil to the coils. A plurality of rolling elements are disposed between rotatably couple the outer ring with the inner ring.

20 Claims, 5 Drawing Sheets

BEARING WITH INCORPORATED WIRELESS POWER TRANSMISSION DEVICE

BACKGROUND OF THE INVENTION

The present invention relates to both bearings and power transmission devices, and more particularly to power transmission devices for electric motors with shafts supported by bearings.

Electric motors are well known and include a stator with one or more magnets, typically electromagnets, and a rotor disposed within the stator, mounted on or connected to a shaft and including one or more magnets. When the rotor magnets are electromagnetic coils, electric current or power must be supplied to these coils in order to generate the required magnetic fields which interact with corresponding magnetic fields of the stator. Typically, electric power is supplied to the rotor electromagnetic coils by means of one or more fixed conductors electrically connected with a power supply, for example a battery, and rotatable conductors mounted on the shaft and electrically connected with the rotor electromagnet(s) and contacted by the fixed conductor(s).

As the rotor shaft angularly displaces about a central axis, the rotatable conductors slide against the fixed conductors to continuously transfer current from the power supply to the rotor electromagnetic coil(s). Due to such sliding motion, both the fixed and rotatable conductors may experience wear, such that the power transfer between the conductors is reduced or even entirely disrupted and correspondingly reduce or cease the current flow to the rotor electromagnetic coils. Also, debris or contaminants may become disposed or "lodged" in the interface between the conductors with a resultant diminishment or cessation of current flow to the rotor. Further, the sliding contact between the conductors increases the friction loading on the rotor shaft.

Due to these potential issues, a typical motor used in an electric vehicle has a rotor with permanent magnets so that there is no need to supply current to the rotor. Although such a power system is relatively robust, the permanent magnets required to generate sufficient torque to drive an electric vehicle are substantially large and thereby significantly increases the weight of the vehicle. Further, such large permanent magnets are typically formed of rare earth elements such as neodymium, terbium, dysprosium, etc., such that detrimental environmental impacts may result from the mining, processing and disposal of such materials.

SUMMARY OF THE INVENTION

In one aspect, the present invention is a bearing assembly with a power transmission device for transmitting electric power from a battery to an electric motor. The motor has a housing, an outer stator connected with the housing and an inner rotor mounted to a shaft, disposed within the stator and rotatable about a central axis extending through the shaft, the rotor having at least one electromagnetic coil. The bearing assembly comprises an outer ring connectable with the housing, the outer ring having an outer raceway and a transmitter coil spaced axially from the outer raceway. The transmitter coil is electrically connectable with the battery and configured to generate an electromagnetic field when current flows through the transmitter coil. An inner ring is disposeable about the shaft and has an inner raceway and a receiver coil spaced axially from the inner raceway so as to be located proximal to and inductively coupled with the transmitter coil. As such, electric current is generated within the receiver coil when current flows through the transmitter coil. Further, the receiver coil is electrically connectable with the at least one electromagnetic coil of the rotor, such that electric current flows from receiver coil to the electromagnetic coil. Furthermore, a plurality of rolling elements are disposed between the outer raceway and the inner raceway and rotatably couple the outer ring with the inner ring to thereby couple the rotor shaft with the housing.

In another aspect, the present invention is also a drive motor assembly for an electric vehicle having at least one wheel. The motor assembly comprises an electric motor configured to rotatably drive the at least one wheel, the motor having a housing, an outer stator connected with the housing and an inner rotor. The rotor is mounted on a shaft, disposed within the stator and rotatable about a central axis extending through the shaft, the rotor having at least one electromagnetic coil. The motor assembly further comprises a battery and a bearing assembly with a power transmission device as described in the preceding paragraph.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
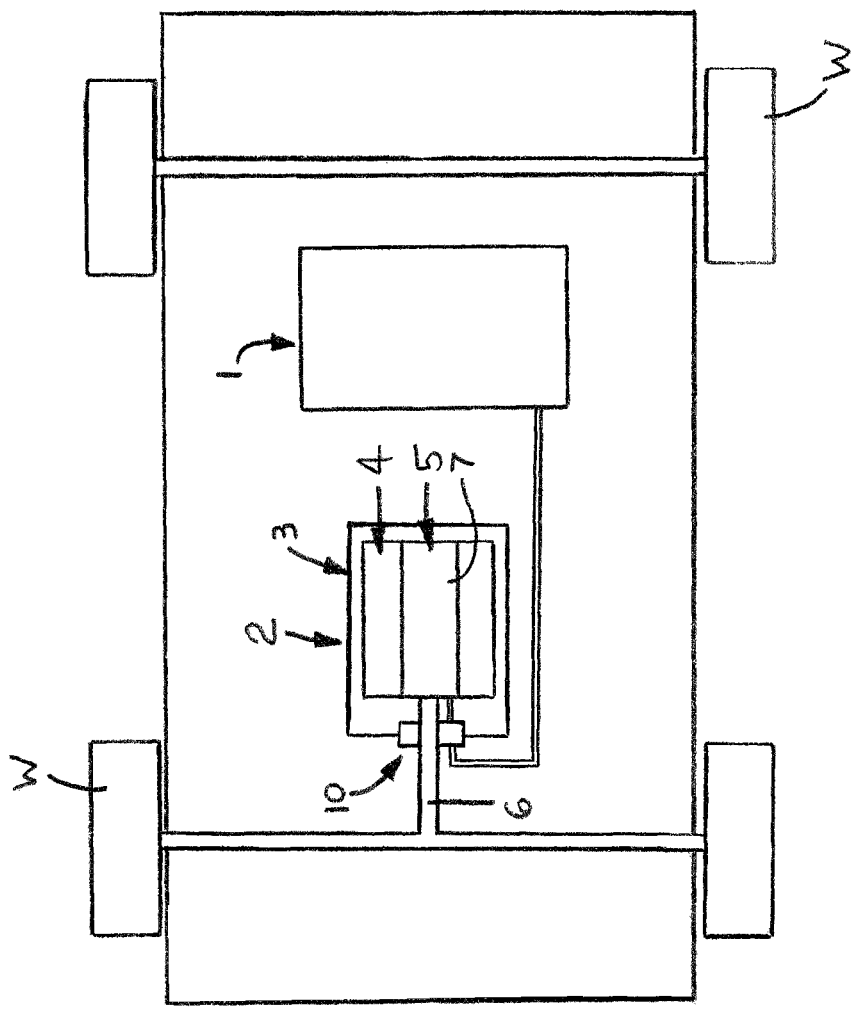
FIG. 1 is a more diagrammatic view of an electric vehicle having a bearing assembly with a power transmission device in accordance with the present invention.

Referring now to the drawings in detail, wherein like numbers are used to indicate like elements throughout, there is shown in FIGS. 1-5 a bearing assembly 10 with an incorporated wireless power transmission device 11 for transmitting electric power from a battery 1, which is preferably a battery pack, to an electric motor 2, preferably through an electronic power inverter attached to the motor 2. The motor 2 is preferably a drive motor of an electric vehicle V with four wheels W, as depicted in FIG. 1, but may alternatively be any other appropriate type of electric motor. The motor 2 has a housing 3, an outer stator 4 connected with the housing 3 and an inner rotor 5. The rotor 5 is mounted to a shaft 6, disposed within the stator 4 and rotatable about a central axis Ac extending through the shaft 6. The rotor 5 has at least one and preferably a plurality of electromagnetic coils 7. Basically, the bearing assembly 10 with the power transmission device 11 comprises an outer ring 12 with a transmitter coil 14, an inner ring 16 with a receiver coil 18 disposed within the outer ring 12 and a plurality of rolling elements 20 disposed between and rotatably coupling the inner and outer rings 12, 16. Electric power is wirelessly transferred from the transmitter coil 14 to the receiver coil 18 during rotation of the inner ring 16, as described in detail below.

Figure 3:
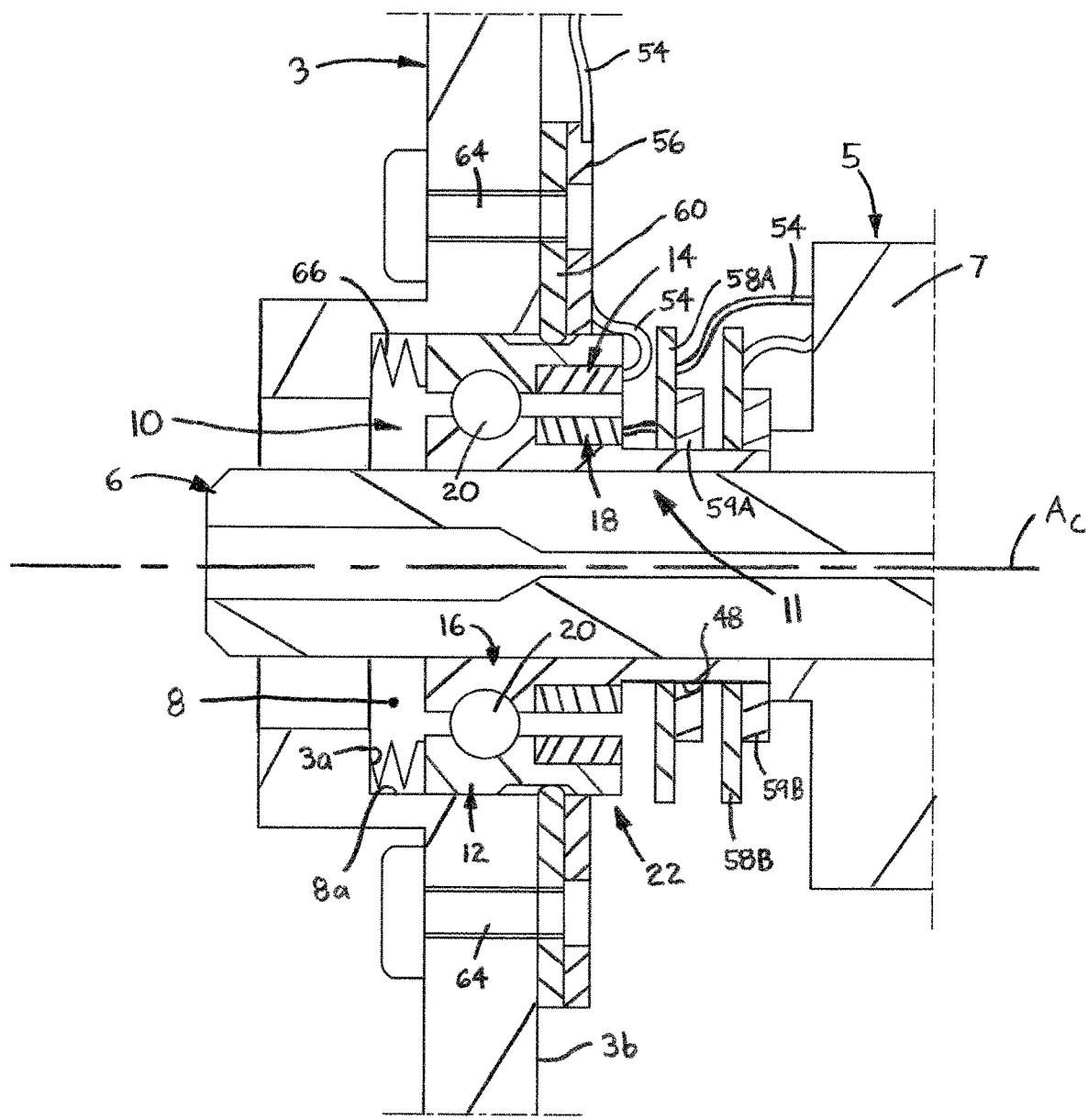
FIG. 3 is an axial cross-sectional view of the drive system including the bearing assembly of the present invention, shown installed about a shaft and connected with a housing.
Figure 4:
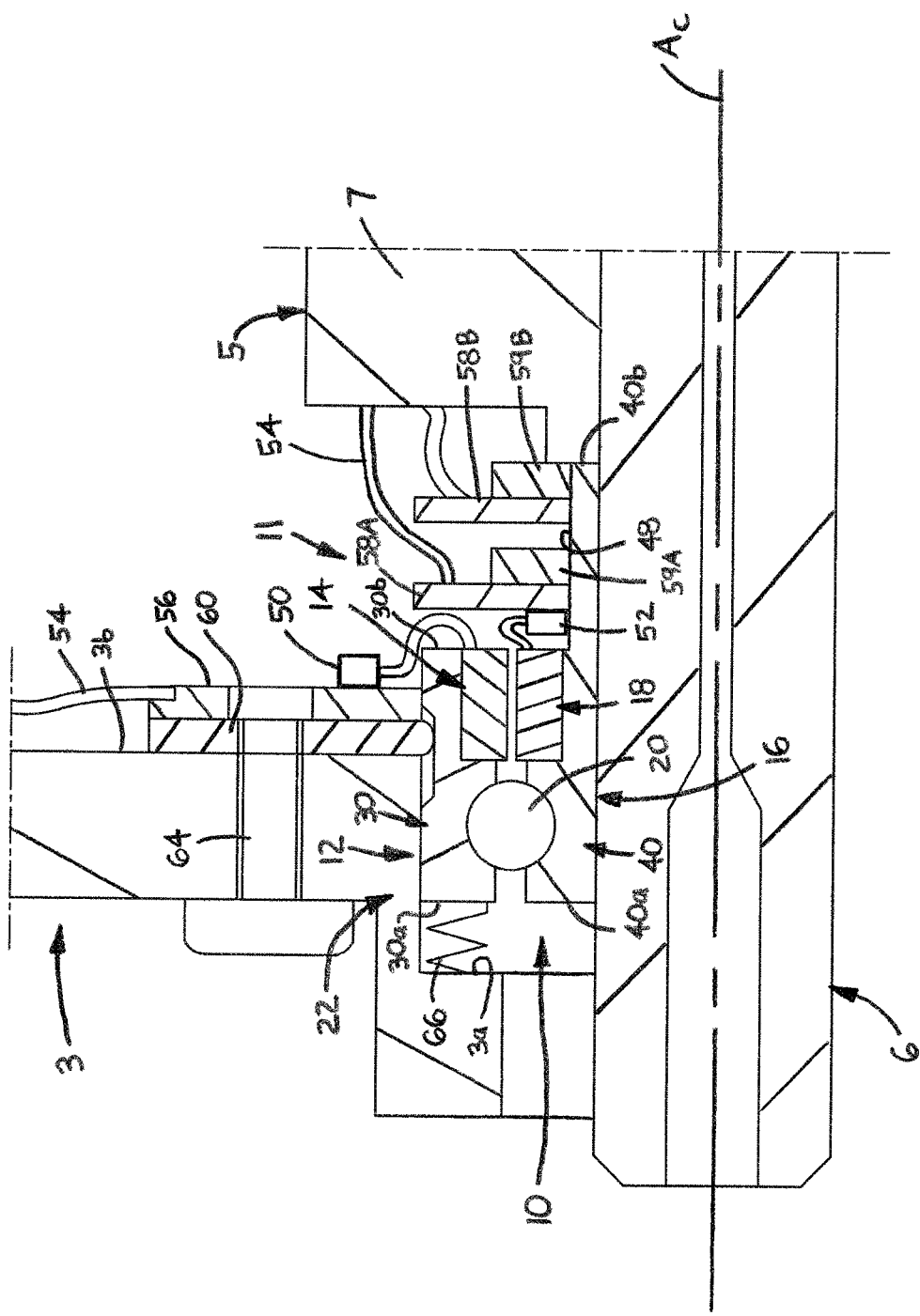
FIG. 4 is a broken-away, enlarged view of a portion of FIG. 3.
Figure 5:
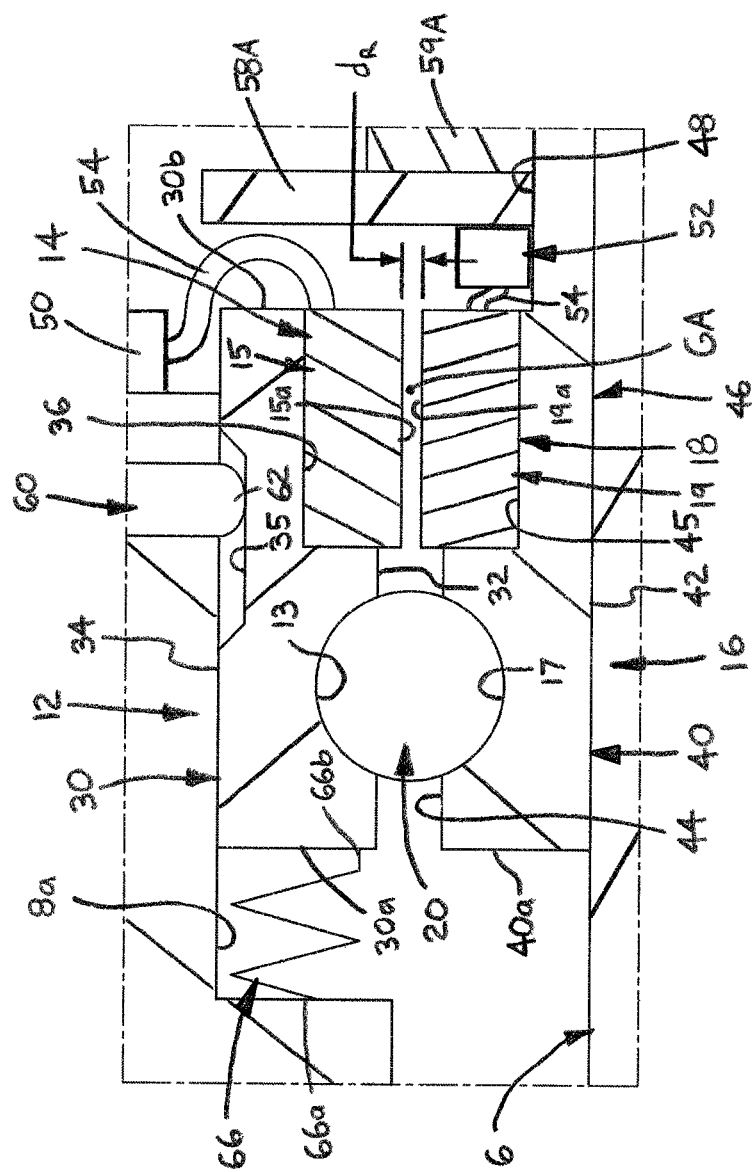
FIG. 5 is broken-away, more enlarged view of a portion of FIG. 3.

Referring to FIGS. 3-5, the outer ring 12 is connected or connectable with the housing 3 and has an outer raceway 13, the transmitter coil 14 being attached to the outer ring 12 and spaced axially from the outer raceway 13. The transmitter coil 14 is electrically connectable with the battery 1, preferably through one or more electronic components as discussed below, and is preferably configured to generate an electromagnetic field. The inner ring 16 is disposeable or disposed about the shaft 6 and has an inner raceway 17, the receiver coil 18 being attached to the inner ring 16 and spaced axially from the inner raceway 17 so as to be located proximal to and magnetically coupled with the transmitter coil 14. The receiver coil 18 is electrically connectable with the at least one electromagnetic coil 7 of the rotor 5 such that current generated within the receiver coil 18 flows to the electromagnetic coil(s) 18, preferably through one or more electronic components described below.

More specifically, the transmitter coil 14 receives electric current and generates an electromagnetic field which induces an electric current within the receiving coil 18, which is referred to as "inductive coupling" and is well known in the field of electronics, such that a detailed explanation of the coils 14, 18 is beyond the scope of the present disclosure. In order to provide sufficient electric current to the rotor 5 in the preferred application of an electric vehicle V, the transmitter coil 14 is configured, i.e., constructed, sized, etc., to have the capacity to transmit an amount of electrical power within a range of one hundred watts (100 W) and three kilowatts (3 kW) and the receiver coil 18 is similarly configured to receive an amount of electrical power within the range of one hundred watts (100 W) and three kilowatts (3 kW). However, the two coils 14, 18 may be sized or formed with a substantially lower or substantially greater capacity to transmit electric power depending on the specific application of the bearing assembly 10.

Further, the plurality of rolling elements 20 are disposed between the outer raceway 13 and the inner raceway 17 and rotatably couple the outer ring 12 with the inner ring 16 and forming a bearing 22. As depicted, the rolling elements 20 are preferably balls, but may alternatively be cylindrical rollers, tapered rollers, needles or any other appropriate type of rolling element. The rolling elements 20 may be conventionally formed of steel, but may alternatively be formed of ceramic or another appropriate insulative material to provide insulation between the bearing raceways 13, 17. Although not presently preferred, the bearing rings 12, 16 may even alternatively be formed as components of a plain bearing with an inner circumferential surface of the outer ring 12 being slidable disposed about an outer circumferential surface of the inner ring 16, the transmitter and receiver coils 14, 18 being appropriately positioned within the rings 12, 16 (structure not shown).

Preferably, the outer ring 12 includes an annular body 30 with opposing first and second axial ends 30a, 30b, respectively, an inner circumferential surface 32 and an opposing outer circumferential surface 34. The outer raceway 13 extends radially outwardly from the inner circumferential surface 32 and the transmitter coil 14 is either disposed directly on the inner circumferential surface 32 or, preferably, within an annular recess 36 extending radially outwardly from the inner circumferential surface 32. Further, the outer circumferential surface 34 is slidably disposed within a bore 8 of the housing 3 and has an annular groove 35 extending radially inwardly from the outer surface 34, for reasons discussed below.

Similarly, the inner ring 16 includes an annular body 40 with opposing first and second axial ends 40a, 40b, respectively, an inner circumferential surface 42 and an opposing outer circumferential surface 44. The inner raceway 17 extends radially inwardly from the outer circumferential surface 44 and the receiver coil 18 is either disposed directly on the outer circumferential surface 44 or, preferably, within an annular recess 45 extending radially inwardly from the outer circumferential surface 44. Further, the inner circumferential surface 42 defines an annular bore 46 which receives a portion of the shaft 6, the ring 16 preferably being frictionally engaged with the shaft 6.

Preferably, the annular body 40 of the inner ring 16 has an axial length (not indicated) between the ends 40a, 40b that is substantially greater than an axial length (not indicated) between the ends 30a, 30b of the body 30 of the outer ring 12. As such, an exterior mounting surface section 48 of the outer circumferential surface 44 extends between the second axial end 40b and the receiver coil 18. As described below, the mounting surface section 48 provides mounting surfaces for certain electronic components connected with the receiver coil 18.

In a presently preferred embodiment, each one of the transmitter coil 14 and the receiver coil 18 is annular, with the receiver coil 18 being disposed coaxially within the transmitter coil 14. More specifically, the transmitter coil 14 has an annular body 15 with an inner circumferential surface 15a and the receiver coil 18 has an annular body 19 with an outer circumferential surface 19a spaced radially inwardly from the inner circumferential surface 15a of the transmitter coil 14. As such, an annular air gap GA (FIG. 5) is defined between the two surfaces 15a, 19a, as indicated in FIG. 5. Preferably, transmitter coil 14 and the receiver coil 18 are each sized such that a radial dimension $d_R$ of the annular air gap GA has a value of no greater than five millimeters (5 mm) and preferably about one millimeter (1 mm). With such a relatively small or narrow air gap GA, the power transmission device 11 is capable of transferring a relatively substantial amount of electric power, as discussed above, with a relatively high efficiency, preferably with an efficiency of greater than ninety-five percent (>95%).

Alternatively, the transmitter coil 14 and the receiver coil 18 may again be formed annular, but spaced axially apart and having facing axial end surfaces (not shown). As another alternative, each one of the transmitter coil 14 and the receiver coil 18 may be formed with facing angled surfaces that are spaced both radially and axially apart. Further, both the transmitter coil 14 and the receiver coil 18, as well as supporting electronic components for the coils 14, 18, may be formed or configured to provide bidirectional signal or data transmission. For example, data may be transferred from the rotor 5 (e.g., taken by sensors) to a non-rotating component (e.g., a motor controller, vehicle computer, etc.) and provide information on the rotor 5, such as temperature, etc., to a vehicle control system (not shown). As another example, a vehicle control system can provide instructions to adjust a rectifier system (not shown) by sending data or commands from the transmitter coil 14 to the receiver coil 18, the receiver coil 18 being connected with the rectifying system. The scope of the present invention encompasses all of these disclosed structures of the coils 14, 18 and any other appropriate structure that is disposeable within or on the bearing rings 12, 16 and capable of functioning as described herein.

Figure 2:
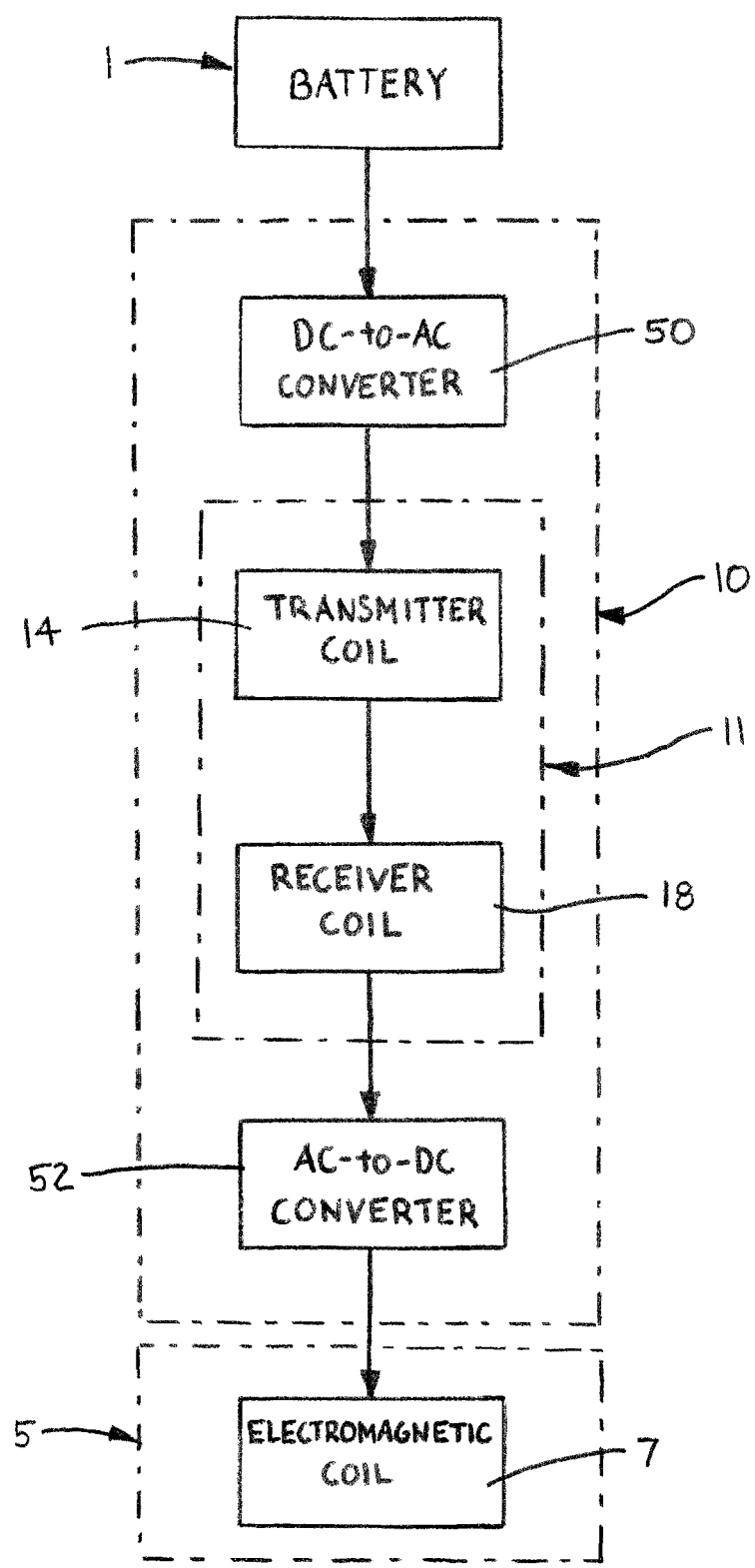
FIG. 2 is a block diagram of certain electronic components of the drive system of the vehicle, showing an exemplary flow of electric power through the vehicle.

Referring now to FIGS. 2, 4 and 5, the battery 1 provides direct current (DC) and the preferred electromagnetic coil(s) 7 of the rotor 5 require direct current. However, the transmitter coil 14 requires alternating current (AC) and generates alternating current within the receiver coil 18. As such, the power transmission device 11 further comprises a direct current to alternating current (DC-to-AC) power converter 50, which is preferably mounted to the housing 3, and an alternating current to direct current (AC-to-DC) power converter 52, which is preferably mounted to the inner ring 16. More specifically, the DC-to-AC power converter 50 is electrically connectable/connected with the battery 1 and is electrically connected with the transmitter coil 14, for example connected to each by means of a wire 54, which may be hard-wired or removably connected (e.g., a plug-socket connection). The DC-to-AC power converter 50 is configured to convert direct current from the battery 1 to alternating current and to transmit the alternating current to the transmitter coil 14. Preferably, the DC-to-AC converter 50 is disposed on a printed circuit board (PCB) 56 connectable or connected to the housing 3. Most preferably, the PCB 56 is mounted on a bearing retainer plate 60, as described below.

Further, the AC-to-DC power converter 52 is preferably disposed on the mounting surface section 48 of the inner ring 16 and is electrically connected with the receiver coil 18 and electrically connectable or connected with the at least one electromagnetic coil 7 of the rotor 5, e.g., by a wire 54 or any other appropriate means. The AC-to-DC power converter 52 is configured to convert alternating current generated within the receiver coil 16 to direct current transmittable to the electromagnetic coil(s) 7. Preferably, the AC-to-DC converter 52 is disposed on a printed circuit board (PCB) 58A mounted on the inner ring 16, most preferably on the mounting surface section 48. The PCB 58A is preferably formed as a "horseshoe" PCB with a rectifying system and is retained on the mounting surface 48 by means of an annular retainer 59A engaged with the surface section 48, for example by friction, threading or a key. Further, the AC-to-DC power converter 52 is electrically connected with the electromagnetic coils 7 by any appropriate means, such as for example by two wires 54 (only one shown) connected with the converter 52, the wires 54 being hard-wired or removably connected (e.g., by detachable contacts). Furthermore, the bearing assembly 10 may further comprise a second printed circuit board 58B disposed on the mounting surface 48 of the inner ring 16, and retained by a second annular retainer 59B, for providing additional functionality to the bearing assembly 10.

Referring now to FIGS. 3-5, as discussed above, the bearing outer ring 12 is preferably slidably disposed within the housing bore 8 so as to enable axial displacement of the outer ring 12 to accommodate or adjust to thermal expansion of the shaft 6. More specifically, the bore 8 has an inner circumferential surface 8a and the housing 3 further has a radial shoulder 3a extending radially inwardly from the bore 8. The bearing outer ring 12 is disposed within the bore 8 such that bearing outer circumferential surface 34 is slidably disposed against the bore inner surface 8a. Further, the housing 3 preferably further includes an annular retainer plate 60 that is attached to a radial end surface 3b of the housing 3 and having an inner radial end 62 disposeable within the annular groove 35 of the outer ring body 30 to retain the outer ring 12 within the housing bore 3 while allowing axial displacement, as best shown in FIG. 5. Preferably, the PCB 50 is mounted to the retainer plate 60 by any appropriate means, such as for example, by one or more threaded fasteners 64 as depicted.

Furthermore, the bearing assembly 10 further comprises at least one biasing member 66 disposed within the housing bore 3 and having a first end 66a disposed against the housing shoulder surface 3a and a second axial end 66b disposed against the first axial end 30a of the outer ring 12. The biasing member(s) 66 are each configured to exert an axial force on the first axial end 30a of the outer ring body 30 in a direction toward the retainer plate 60. Thereby, the bearing outer ring 12 is capable of limited axial displacement but an appropriate preload is always established within the rolling elements 20. Preferably, the at least one biasing member 66 is a single wave spring (not depicted), but may alternatively include a plurality of coil springs (as shown), a solid elastomeric member(s), etc. However, the bearing outer ring 12 may alternatively be fixedly disposed within the housing bore 8, such as by means of a friction fit between the bore inner surface 8a and the ring outer surface 34.

The bearing assembly 10 of the present invention has a number of advantages over previously known bearings for electric motors and power transmission devices for transmitting current to the motor rotor. By incorporating the power transmission device 11 within the bearing assembly 10, the power transmission components, e.g., the transmission and receiver coils 14, 18, the power converters 50, 52, etc., are installed simultaneously with the installation of the bearing 22 supporting the rotor shaft 6. As such, a separate installation process for the power components is eliminated and the axial space for the power components is reduced. Further, by providing electric power from the battery 1 to the rotor 5 by means of a wireless power transfer device 11, the friction loading on the shaft 6 is reduced and both reliability and power density of the power transfer is substantially increased in comparison to transfer by contacting conductors. Also, the transmitter coil 14 and the receiver coil 18 are enclosed within the bearing rings 12, 16, thereby providing substantial protection to these components 14, 18 and eliminating the need for a separate housing.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A bearing assembly with a power transmission device for transmitting electric power from a battery to an electric motor, the motor having a housing, an outer stator connected with the housing and an inner rotor mounted to a shaft, disposed within the stator and rotatable around a central axis extending through the shaft, the rotor having at least one electromagnetic coil, the bearing assembly comprising:
   an outer ring connectable with the housing, the outer ring having an outer raceway and a transmitter coil spaced axially from the outer raceway, the transmitter coil being electrically connectable with the battery and configured to generate an electromagnetic field when current flows through the transmitter coil;
   an inner ring disposed within the outer ring, disposeable around the shaft and having an inner raceway and a receiver coil spaced axially from the inner raceway so as to be inductively coupled with the transmitter coil such that electric current is generated within the receiver coil when current flows through the transmitter coil, the receiver coil being electrically connectable with the at least one electromagnetic coil of the rotor such that electric current flows from receiver coil to the electromagnetic coil; and
   a plurality of rolling elements disposed between the outer raceway and the inner raceway and rotatably coupling the outer ring with the inner ring to thereby couple the rotor shaft with the housing.

2. The bearing assembly as recited in claim 1, wherein the transmitter coil is annular and has an inner circumferential surface, the receiver coil is annular, is disposed within the transmitter coil and has an outer circumferential surface, an annular air gap being defined between the inner circumferential surface of the transmitter coil and the outer circumferential surface of the receiver coil.

3. The bearing assembly as recited in claim 2, wherein the transmitter coil and the receiver coil are each sized such that a radial dimension of the annular air gap has a value of no greater than five millimeters (5 mm).

4. The bearing assembly as recited in claim 1, wherein the transmitter coil is configured to transmit an amount of electrical power within a range of one hundred watts and three kilowatts and the receiver coil is configured to receive an amount of electrical power within the range of one hundred watts and three kilowatts.

5. The bearing assembly as recited in claim 1, wherein:
   the outer ring has an inner circumferential surface, the outer raceway extending radially outwardly from the inner circumferential surface and the transmitter coil is disposed on the inner circumferential surface or on an annular recess extending radially outwardly from the inner circumferential surface; and
   the inner ring has an outer circumferential surface, the inner raceway extending radially inwardly from the outer circumferential surface and the receiver coil being disposed on the outer circumferential surface or an annular recess extending radially inwardly from the outer circumferential surface.

6. The bearing assembly as recited in claim 1, further comprising a DC-to-AC power converter mounted to the housing, electrically connectable with the battery and with the transmitter coil and configured to convert direct current from the battery to alternating current and to transmit the alternating current to the transmitter coil.

7. The bearing assembly as recited in claim 6, wherein the DC-to-AC power converter is disposed on a printed circuit board connectable to the housing.

8. The bearing assembly as recited in claim 1 further comprising an AC-to-DC power converter mounted to the inner ring, the AC-to-DC converter is electrically connected with the receiver coil, electrically connectable with the at least one electromagnetic coil of the motor and configured to convert alternating current generated within the receiver coil to direct current transmittable to the electromagnetic coil.

9. The bearing assembly as recited in claim 8, wherein the wherein the AC-to-DC power converter is disposed on a printed circuit board mounted on the inner ring.

10. The bearing assembly as recited in claim 1, wherein the outer ring of the bearing is slidably disposeable within a bore of the housing.

11. A drive motor assembly for an electric vehicle having at least one wheel, the motor assembly comprising:
   an electric motor configured to rotatably drive the at least one wheel, the motor having a housing, an outer stator connected with the housing and an inner rotor, the rotor being mounted on a shaft, disposed within the stator and rotatable around a central axis extending through the shaft, the rotor having at least one electromagnetic coil;
   a battery; and
   a bearing assembly with a power transmission device for transmitting electric power from the battery to the motor and including:
      an outer ring connected with the housing, the outer ring having an outer raceway and a transmitter coil spaced axially from the outer raceway, the transmitter coil being electrically connectable with the battery and configured to generate an electromagnetic field when current flows through the transmitter coil;
      an inner ring disposed within the inner ring, disposed around the shaft and having an inner raceway and a receiver coil spaced axially from the inner raceway so as to be inductively coupled with the transmitter coil such that electric current is generated within the receiver coil when current flows through the transmitter coil, the receiver coil being electrically connected with the at least one electromagnetic coil of the rotor such that electric current flows from receiver coil to the electromagnetic coil; and
      a plurality of rolling elements disposed between the outer raceway and the inner raceway and rotatably coupling the outer ring with the inner ring to thereby rotatably couple the rotor shaft with the housing.

12. The motor assembly as recited in claim 11, wherein the transmitter coil is annular and has an inner circumferential surface, the receiver coil is annular, is disposed within the transmitter coil and has an outer circumferential surface, an annular air gap being defined between the inner circumferential surface of the transmitter coil and the outer circumferential surface of the receiver coil.

13. The motor assembly as recited in claim 12, wherein the transmitter coil and the receiver coil are each sized such that a radial dimension of the annular air gap has a value of no greater than five millimeters (5 mm).

14. The motor assembly as recited in claim 11, wherein the transmitter coil is configured to transmit an amount of electrical power within a range of one hundred watts and three kilowatts and the receiver coil is configured to receive an amount of electrical power within the range of one hundred watts and three kilowatts.

15. The motor assembly as recited in claim 11, wherein:
the outer ring has an inner circumferential surface, the outer raceway extending radially outwardly from the inner circumferential surface and the transmitter coil is disposed on the inner circumferential surface or on an annular recess extending radially outwardly from the inner circumferential surface; and
the inner ring has an outer circumferential surface, the inner raceway extending radially inwardly from the outer circumferential surface and the receiver coil being disposed on the outer circumferential surface or an annular recess extending radially inwardly from the outer circumferential surface.

16. The motor assembly as recited in claim 11, further comprising a DC-to-AC power converter mounted to the housing, electrically connectable with the battery and with the transmitter coil and configured to convert direct current from the battery to alternating current and to transmit the alternating current to the transmitter coil.

17. The motor assembly as recited in claim 16, wherein the DC-to-AC power converter is disposed on a printed circuit board connectable to the housing.

18. The motor assembly as recited in claim 11, further comprising an AC-to-DC power converter mounted to the inner ring, the AC-to-DC converter is electrically connected with the receiver coil, electrically connectable with the at least one electromagnetic coil of the motor and configured to convert alternating current generated within the receiver coil to direct current transmittable to the electromagnetic coil.

19. The motor assembly as recited in claim 18, wherein the wherein the AC-to-DC power converter is disposed on a printed circuit board mounted on the inner ring.

20. The motor assembly as recited in claim 11, wherein the outer ring of the bearing is slidably disposeable within a bore of the housing.

* * * * *